United States Patent
Yamada et al.

(10) Patent No.: US 7,551,330 B2
(45) Date of Patent: Jun. 23, 2009

(54) IMAGE READING DEVICE, METHOD OF CONTROLLING THE SAME, CONTROL PROGRAM, STORAGE MEDIUM AND IMAGE FORMING APPARATUS PROVIDED WITH THE IMAGE READING DEVICE

(75) Inventors: Masakatsu Yamada, Ibaraki (JP); Toshiyuki Takano, Ibaraki (JP); Yasushi Ishida, Ibaraki (JP); Toshiaki Saito, Ibaraki (JP); Takashi Imai, Chiba (JP); Shigeyuki Sugiyama, Kanagawa (JP); Makoto Satake, Chiba (JP); Daigo Nakagawa, Ibaraki (JP); Naomi Nakamura, Chiba (JP); Nobuyuki Bannai, Chiba (JP); Takuma Suzuki, Tokyo (JP); Seiya Fujinaga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 11/513,063

(22) Filed: Aug. 31, 2006

(65) Prior Publication Data

US 2006/0285179 A1 Dec. 21, 2006

Related U.S. Application Data

(62) Division of application No. 10/200,138, filed on Jul. 23, 2002, now Pat. No. 7,133,165.

(30) Foreign Application Priority Data

Aug. 6, 2001 (JP) ............................. 2001-238500
Sep. 13, 2001 (JP) ............................. 2001-278601

(51) Int. Cl.
*H04N 1/04* (2006.01)
(52) U.S. Cl. ..................... 358/474; 358/486; 358/497; 358/1.2; 358/1.12; 382/274; 382/275; 250/208.1

(58) Field of Classification Search ................. 358/474, 358/486, 475, 497, 1.12, 404, 483, 412, 452, 358/406, 537, 576, 518, 520, 1.5; 250/208.1, 250/578; 382/167, 236, 255, 274, 275
See application file for complete search history.

(56) References Cited

U.S. PATENT DOCUMENTS 4,568,171 A  2/1986 Ikenoue ..................... 399/208

(Continued)

FOREIGN PATENT DOCUMENTS

EP    0 853 415 A2    9/1997

(Continued)

OTHER PUBLICATIONS 10-2002-0046022 Korean Office Action, dated Aug. 11, 2005, in counterpart application, citing 2000-115479 Japanese Patent.

(Continued)

*Primary Examiner*—Negussie Worku
(74) *Attorney, Agent, or Firm*—Fitzpatrick, Cella, Harper & Scinto (57) ABSTRACT

An image reading device includes a memory unit for storing positional information of a sensor for moving by a drive unit to read an image of a document and a control unit for controlling the drive unit to move the sensor based on the positional information stored in the memory unit. The control unit drives the drive unit by an amount of driving sufficient for an image reading unit to move in a predetermined direction to abut the stop members, controls the drive unit to move the sensor so as to detect the position mark, and updates the positional information of the memory unit to a predetermined initial value based on the detection of the position mark by the sensor. The image reading device can store data of a reference position promptly even if a photo-interrupter is not provided when the data of the reference position is not stored in a memory unit.

14 Claims, 11 Drawing Sheets

U.S. PATENT DOCUMENTS

| | | | | |
|---|---|---|---|---|
| 4,634,885 A * | 1/1987 | Inoue et al. | .................. | 358/483 |
| 4,749,872 A | 6/1988 | Asada et al. | .................. | 250/578 |
| 5,144,455 A | 9/1992 | Stein et al. | .................. | 358/443 |
| 5,245,354 A * | 9/1993 | Ono et al. | .................... | 347/217 |
| 5,282,064 A | 1/1994 | Yamada | ...................... | 358/487 |
| 5,467,198 A * | 11/1995 | Aosaki et al. | ................ | 358/400 |
| 5,493,415 A * | 2/1996 | Mita et al. | ................... | 358/444 |
| 5,719,404 A | 2/1998 | Tsai | ...................... | 250/559.29 |
| 5,721,423 A | 2/1998 | Hamamoto | .............. | 250/208.1 |
| 5,966,220 A | 10/1999 | Miyamoto et al. | .......... | 358/475 |
| 6,229,629 B1 | 5/2001 | Tsai | ........................... | 358/486 |
| 6,765,700 B1 * | 7/2004 | Naito et al. | ................. | 358/486 |
| 6,788,435 B2 * | 9/2004 | Ouchi et al. | ................ | 358/474 |
| 7,133,165 B2 * | 11/2006 | Yamada et al. | .............. | 358/474 |
| 2002/0057465 A1 * | 5/2002 | Anzai | ......................... | 358/474 |

FOREIGN PATENT DOCUMENTS

| | | |
|---|---|---|
| EP | 0 892 546 A2 | 7/1998 |
| JP | 04-329531 | 11/1992 |
| JP | 05-030302 | 2/1993 |
| JP | 08-194808 | 7/1996 |
| JP | 09-200450 | 7/1997 |
| JP | 2000-113163 | 4/2000 |
| JP | 2000-115479 | 4/2000 |
| JP | 2001-005119 | 1/2001 |

OTHER PUBLICATIONS

Search report from the European Patent Office 02017493.4-2202 PCT, dated Aug. 11, 2005, re: counterpart application.

European Office Action, dated Oct. 12, 2007, regarding Application No. 02 017 493.4-2202.

* cited by examiner

IMAGE READING DEVICE, METHOD OF CONTROLLING THE SAME, CONTROL PROGRAM, STORAGE MEDIUM AND IMAGE FORMING APPARATUS PROVIDED WITH THE IMAGE READING DEVICE

This application is a division of application Ser. No. 10/200,138, filed Jul. 23, 2002.

BACKGROUND OF THE INVENTION

1. Field of the Invention

The present invention relates to an image reading device having a reading reference position mark to be a reference for reading an image of a recording material such as manuscript paper or a book and an image forming apparatus having this image reading device provided in an apparatus main body.

2. Related Background Art

Up to now, there is known an image reading device for reading an image of a document line by line by an image sensor. Such an image reading device has a home position sensor that uses a photodiode or the like for detecting a reference position of the image sensor.

In recent years, for the purpose of reducing costs, an image reading device having a structure for detecting a reference position of an image sensor without using a photodiode or the like, such as the one as described in Japanese Patent Application Laid-Open No. 2000-113163, has become well known.

Figure 11:
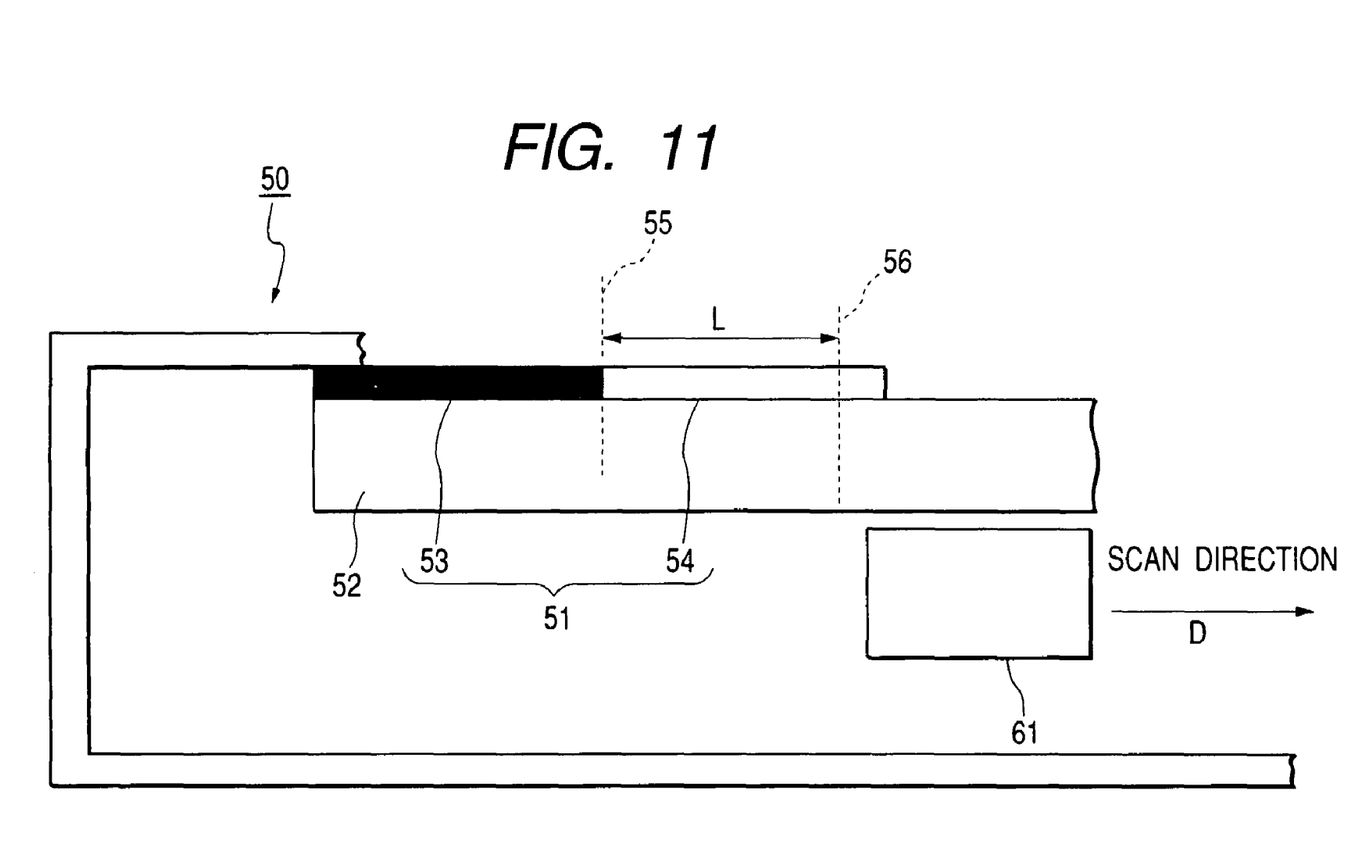
FIG. 11 is a view showing a positional relationship of reading positions of a contact image sensor in a conventional image reading device.

As shown in FIG. 11, this conventional image reading device is provided with an image sensor 61, a copy board glass 52 that is a transparent member for mounting a document, a mark 51 consisting of a black area 53 and a white area 54 on the copy board glass 52, and the like.

This image reading device (apparatus) 50 moves the image sensor 61 in a sub-scanning direction (an arrow D direction), detects the black area 53 and the white area 54 by the image sensor 61 and sets a reference position 55 in a boundary between the black area 53 and the white area 54. The image reading device 50 starts reading of a document (original) with a position to which the image sensor 61 moves by a predetermined length L from the reference position 55 as a reading start position 56.

In addition, the image reading device 50 stores the reference position 55 that is the boundary between the black area 53 and the white area 54 in a memory unit. Initialization and movement of the image sensor 51 at the input of a power supply is performed on the basis of the reference position 55. In addition, movement of the image sensor 51 after starting document reading is performed on the basis of the reference position 55 read out from the memory unit.

However, when the image sensor is initialized after inputting a power supply or when data of the reference position stored in the memory unit is destroyed due to some reason, in order to detect the black area, the conventional image reading device moves the image sensor while reading an image line by line to detect the black area and the white area if the image sensor is in a position apart from the black area and the white area. Thus, the image reading device requires a long time for the detection.

In addition, the image reading device may misread the reference position if a document having a pattern similar to the black area and the white area is placed on the copy board glass.

SUMMARY OF THE INVENTION

The present invention has been provided in view of the above and other drawbacks.

It is an object of the present invention to provide an image reading device that is capable of detecting a reference position promptly without fail and storing data of the reference position when data of the reference position is not stored in a memory part or when data of the reference position is destroyed due to some reason and an image forming apparatus having this image reading device provided in an apparatus main body.

Another object of the present invention is to provide an image reading device including image reading means for moving to read an image of a document, driving means for moving the image reading means, storing means for storing positional information of the image reading means, a reference position mark to be detected by the image reading means, stopping means for abutting the image reading means in a position of a predetermined distance from the reference position mark in a predetermined direction to regulate movement of the image reading means in the predetermined direction and controlling means for controlling the driving means based on the positional information stored in the storing means to move the image reading means, and at the same time, increasing or decreasing the positional information stored in the storing means based on an amount of driving of the driving means, in which if the positional information stored in the storing means is abnormal, the controlling means drives the driving means by an amount of driving sufficient for the image reading means to move in the predetermined direction to abut the stopping means and, thereafter controlling the driving means to move the image reading means so as to detect the reference position mark and updating the positional information stored in the storing means to a predetermined initial value based on the detection of the reference position mark by the image reading means.

In a further object of the present invention, if the positional information is abnormal, the controlling means in the image reading device causes the image reading means to abut the stopping means and, thereafter moving the image reading means by a distance substantially corresponding to the predetermined distance in a direction opposite the predetermined direction, thereby causing the image reading means to detect the reference position mark.

In a further object of the present invention, the driving means in the image reading device includes a stepping motor, and if the positional information is abnormal, the controlling means drives the stepping motor to cause the image reading means to abut the stopping means to cause the stepping motor to step out.

In a further object of the present invention, the controlling means in the image reading device controls the driving means to move the image reading means at a speed faster than that at the time of image reading when the controlling means causes the image reading means to abut the stopping means.

In a further object of the present invention, the driving means in the image reading device has a plurality of pulleys and a belt looped around the pulleys and is structured to move the image reading means by coupling the image reading means to the belt to rotate to drive one of the pulleys, and the stopping means is arranged on a side where a tension of the belt rises when the image reading means is moved in the predetermined direction.

In a further object of the present invention, the image reading means in the image reading device has a holder for holding an image sensor, and the stopping means has ribs provided in a housing containing the image reading means and is structured such that the holder abuts the ribs to stop the image reading means when the image reading means is stopped by the stopping means.

In a further object of the present invention, there is provided an image reading device including buffering means for receiving the image reading means to impair impact of the image reading means abutting said stopping means before the image reading means abuts the stopping means.

In a further object of the present invention, the controlling means in the image reading device causes the storing means to store backup positional information equivalent to the positional information and judges that the positional information is abnormal when the positional information is different from the backup positional information.

A still further object of the present invention is to provide an image forming apparatus including an image reading device according to any one of the above and image forming means for forming an image on a sheet based on image reading information of the image reading device.

Other objects and features of the present invention will be apparent from the following descriptions and the accompanying drawings, in which like reference characters designate the same or similar parts throughout the figures thereof.

DETAILED DESCRIPTION OF THE PREFERRED EMBODIMENTS

An image reading device according to each embodiment of the present invention will be hereinafter described with reference to the accompanying drawings. The image reading device may be provided and used in an apparatus main body of an image forming apparatus such as a copying machine, a printer, a scanner, a facsimile machine or a composite machine as Multi Function Peripheral (MFP) of them as a part of an element of the image forming apparatus. In this case, information read by the image reading device is formed as an image on a sheet by an image forming part (image forming means) of the image forming apparatus. That is, an image read by the image reading device is copied on the sheet by the image forming unit. In the case of a scanner, an image is transferred to a personal computer.

Image Reading Device as a First Embodiment

Figure 1:
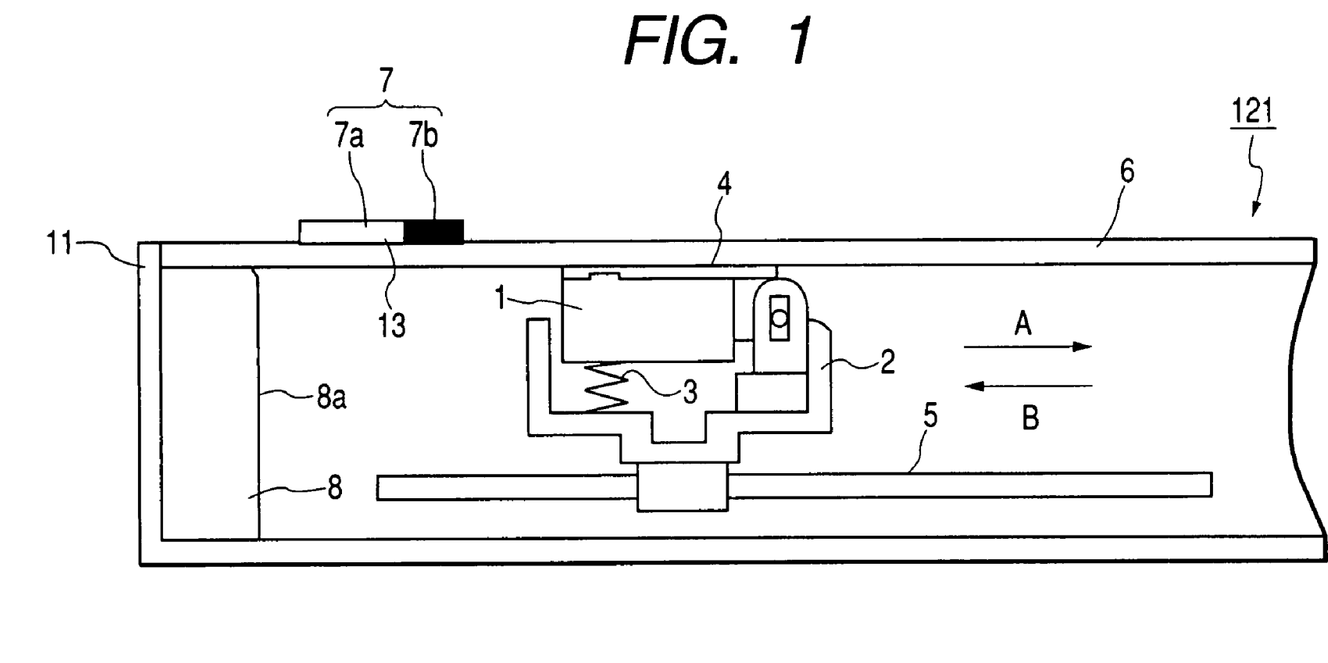
FIG. 1 is a main part sectional view of an image reading device in a first embodiment of the present invention.
Figure 2:
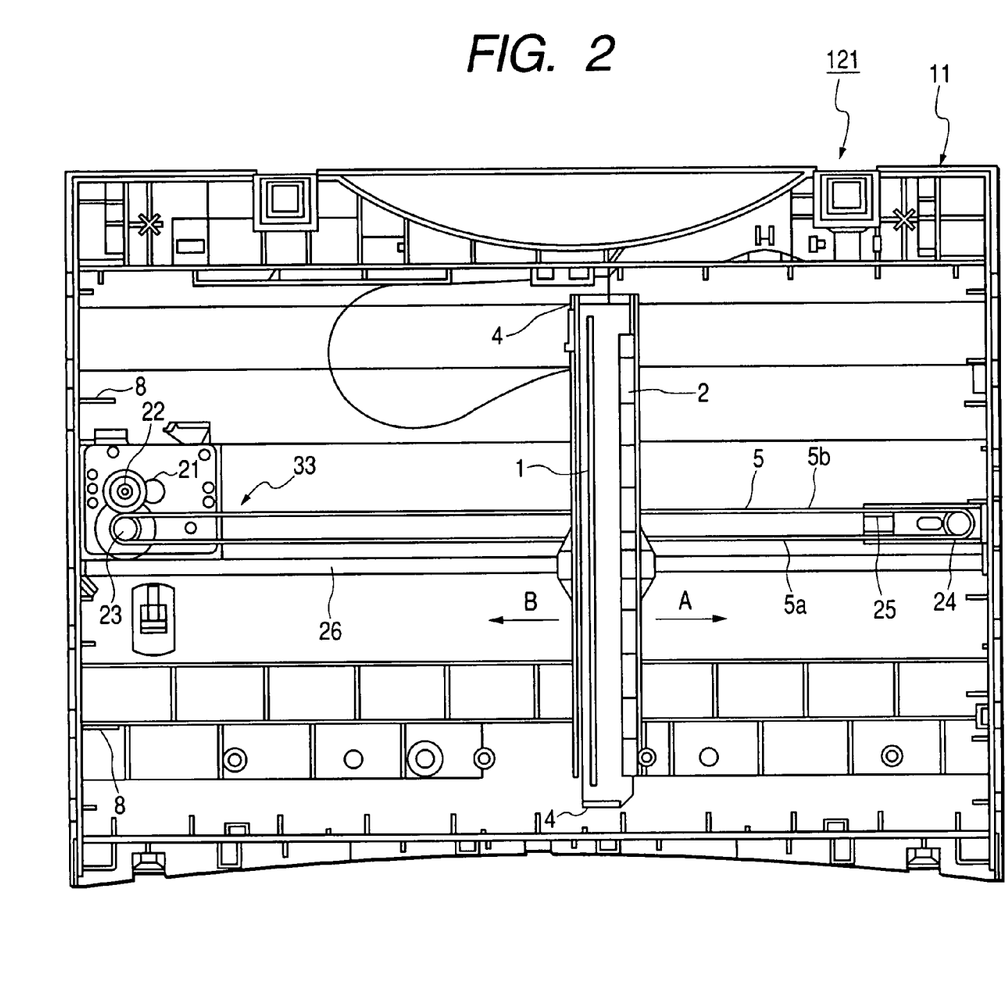
FIG. 2 is a plan view of the image reading device at the time when a copy board glass is removed in the image reading device of FIG. 1.
Figure 3:
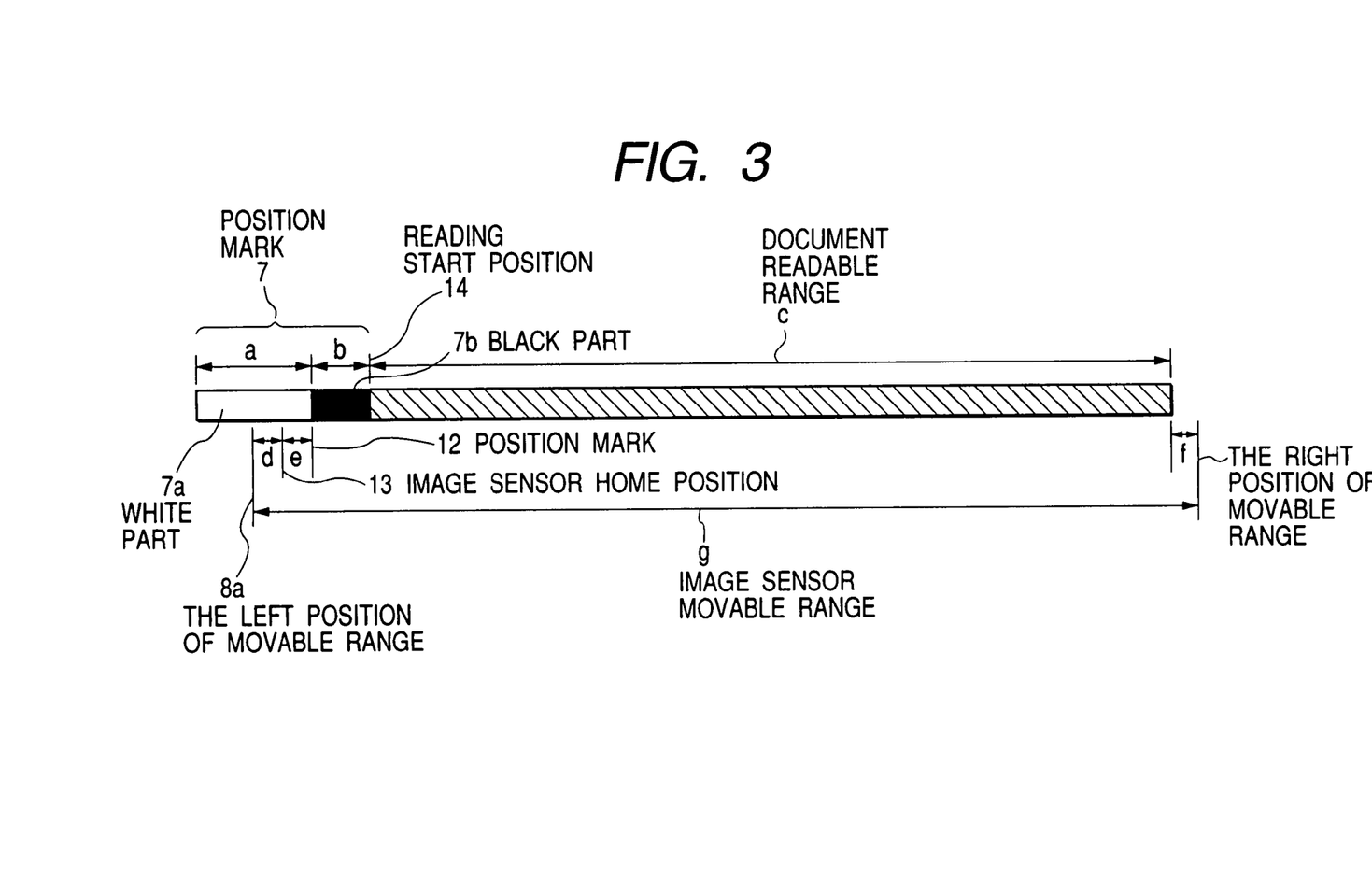
FIG. 3 is a view showing a positional relationship of reading positions of a contact image sensor in the image reading device of FIG. 1.

FIG. 1 is a main part sectional view of an image reading device 121 of a first embodiment of the present invention. FIG. 2 is a plan view of the image reading device 121 from which a copy board glass is removed in FIG. 1. FIG. 3 is a view showing a positional relationship of reading positions of a contact image sensor (hereinafter referred to as "CIS") 1 in the image reading device 121.

The CIS 1 is a sensor for reading an image of a document mounted on a copy board glass 6 as will be described below line by line. The CIS 1 (image reading means) sequentially reads images of lines in a vertical direction (main scanning direction) of FIG. 2 while moving in an arrow A direction (sub-scanning direction).

A holder 2 holds the CIS 1. A spring 3 is provided between the CIS 1 and the holder 2 and presses the CIS 1 against the copy board glass 6 via a spacer 4. The spacer 4 keeps a distance between the CIS 1 and the copy board glass 6 constant to adjust a focus of the CIS. 1. A belt 5 transmits a rotation force of a stepping motor 21 to the holder 2 via a deceleration gear 22 and a pulley 23. The belt 5 is looped while keeping an appropriate tension by a spring 25 provided between the pulley 23 and a pulley 24 on a driven side. The copy board glass 6 is a transparent member for mounting a document thereon. Further, the stepping motor 21, the deceleration gear 22, the pulleys 23 and 24, the belt 5 and the like constitute a driving part (driving means) 33.

A position mark (reference position mark or image for positional detection) 7 consists of two colors of a white part 7a and a black part 7b. Further, the position mark does not have to consist of a white part and a black part but may consist of colors of a different contrast or density whose boundaries can be detected by the CIS 1. In addition, the position mark 7 may be formed on a lower surface of a tape stuck to an upper surface of the copy board glass 6 or may be applied to the copy board glass 6. Therefore, although a thickness of the position mark 7 shown in FIG. 1 is exaggerated and drawn in a thick form in order to clearly show a configuration, it is actually thin. In addition, the position mark 7 is arranged outside an area where a document is mounted (outside an area where a document is read).

Stop members (stopping means) 8 are provided in a frame body 11 and serve as stoppers for receiving the holder 2. The frame body 11 contains main components of the image reading device 121 such as the CIS 1.

The holder 2 is fixed on one side 5a of the belt 5. The holder 2 moves in the arrow A direction and the arrow B direction on a guide shaft 26 by the driving force of the stepping motor 21. The image reading device 121 usually moves the holder 2 in the arrow A direction together with the CIS 1 to read a document.

The holder 2 moves in the arrow B direction by 364 mm by the rotation of the stepping motor 21 to surely abut against the stop members 8 at abutting positions 8a in order to surely move the CIS 1 to the abutting positions 8a of the stop members 8.

If an interval between the holder 2 and the stop members 8 is equal to or less than 364 mm, the stepping motor 21 steps out to stop rotation when the holder 2 or an abutting portion of the image sensor abuts the stop members 8. The step-out continues until the number of steps equivalent to 364 mm is reached. When the holder 2 abuts the stop members 8, the holder 2 cannot move further. Thus, the stepping motor 21 steps out.

At this point, since the belt 5 is a belt with teeth and a side of it as denoted by reference symbol 5*a* is pulled by the rotation of the pulley 23, the side denoted by reference symbol 5*a* becomes a stretched side and a side denoted by reference symbol 5*b* becomes a slack side. The holder 2 is connected to the side denoted by reference symbol 5*a* that becomes the stretched side when the holder 2 moves in the arrow B direction.

Assuming that the motor 21 drives the pulley 24 on the right side of FIG. 2, if the holder 2 is driven in the arrow B direction, the holder 2 is connected to the slack side denoted by reference symbol 5*a*.

Assuming that the holder 2 is connected to the slack side and caused to abut the stop members, slack occurs in the belt 5 to prevent the stepping motor 21 from stepping out and causes tooth skipping between the belt 5 and the pulley 23 to damage a driving system such as the belt 5, the pulley 23, or the gear 22.

However, in the image reading device 121 of this embodiment, since the stepping motor 21 rotates the pulley 23 on the left side of FIG. 2, even if the holder 2 is driven in the arrow B direction to abut the stop members, the holder 2 is fixed on the stretched side 5*a*. Thus, the tooth skipping is not caused and the driving system is not damaged.

In addition, since the holder 2 abuts the stop members 8, impact applied to the CIS 1 can be absorbed by the holder 2 to reduce damages to the CIS 1.

Moreover, since the stop members 8 are provided in the frame 11 on both sides of the belt 5 symmetrically, when the holder 2 abuts the stop members 8, the stop members 8 can stop the holder 2 in a stable state without causing twist in the holder 2.

In addition, since the stop members 8 are ribs integral with the frame 11, the image reading device can be manufactured at low costs without increasing the number of components.

As shown in FIG. 3, the position mark 7 consists of two colors of the white part 7*a* (a=10 mm) and the black part 7*b* (b=5 mm). A position shifted by e (e.g., 3 mm) to the left from a color boundary position 12 of the position mark 7 is a home position 13 of the CIS 1, and a position further shifted by d (e.g., 2 mm) to the left from the home position 13 is a position where the holder 2 abuts the stop members 8 (the abutting positions 8*a* or a left position of movable range). In addition, a, document readable range is c (e.g., 350 mm) starting from the right end of the black part 7*b* of the position mark 7, and the CIS 1 is provided such that it can move by further f (e.g., 2 mm) in the right direction. This position becomes a right position of movable range of the image sensor. The right end of the black part 7*b* is a reading start position 14.

Further, g (=d+e+b+c+f, 362 mm in this example) from the left position of movable range to the right position of movable range becomes a movable range of the image sensor.

In this embodiment, the image reading device is configured with the above-described positional relationship. However, it is needless to mention that the present invention is not limited to this positional relationship and the positional relationship of each portion can be changed to match a shape, a size, and the like of an image reading device in configurations discussed below. In addition, each numerical value is a reference numerical value and does not limit the present invention throughout the description herein.

Figure 4:
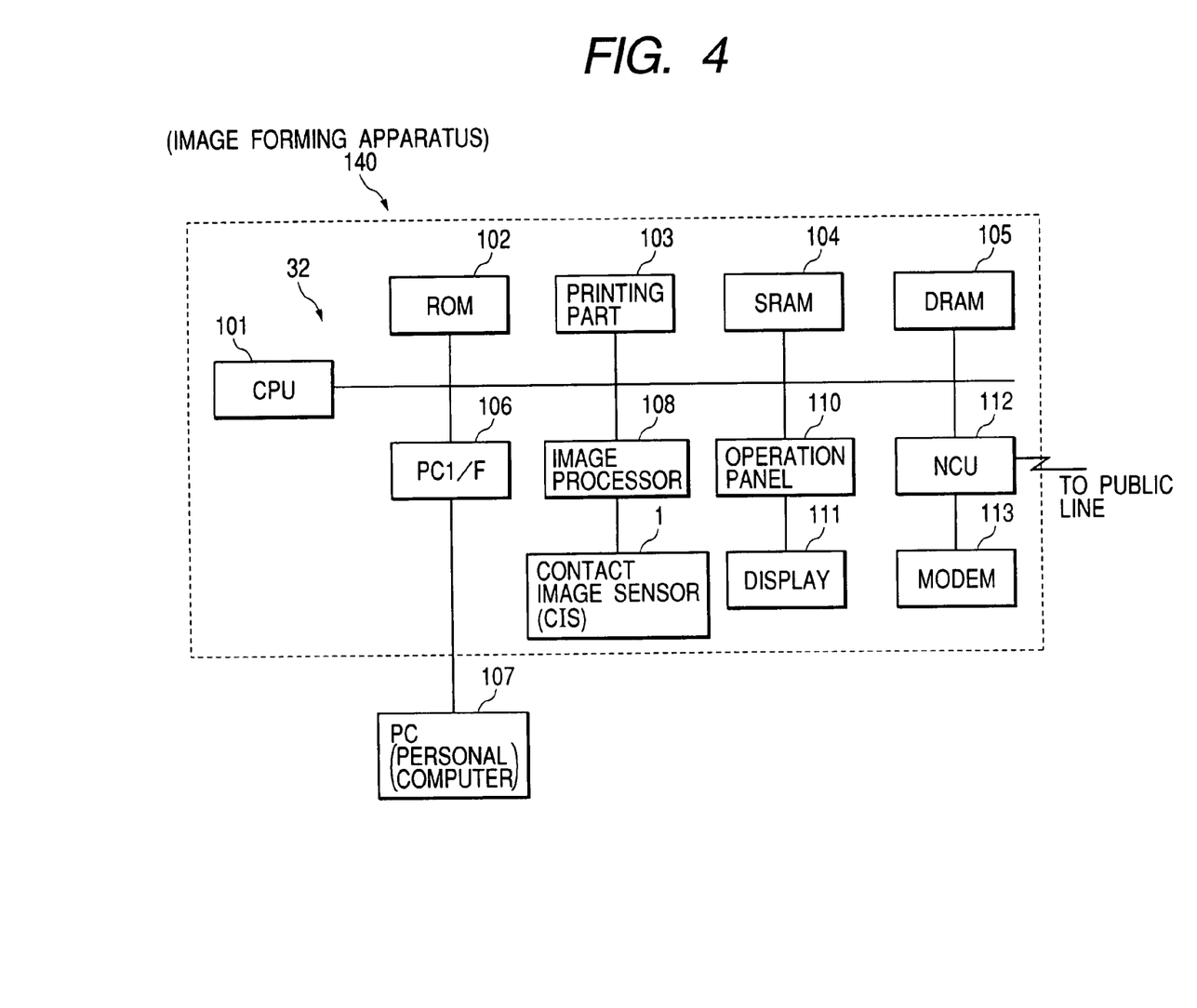
FIG. 4 is a block diagram showing a circuit structure of an image forming apparatus that is an embodiment of the present invention.

FIG. 4 is a block diagram showing a circuit configuration of an image forming apparatus 140 that is an embodiment of the present invention. A CPU 101 is a system control part of the image forming apparatus and controls the entire image forming apparatus. An ROM 102 stores a system control program of the image forming apparatus. Further, the CPU 101 executes various operations for the image forming apparatus based on a control program stored in the ROM 102. Such a control program of the CPU 101 is not limited to the one stored in the ROM 102 and may be a control program stored in an external storage medium in the form of a floppy TM disc, a CD-ROM and the like. This control program may be taken in an RAM (e.g., SRAM 104) of an image reading device by a dedicated reading device, and deciphered and executed by the CPU 101. A printer (image forming means) 103 is for printing inputted image data on a recording sheet. The CPU 101, the ROM 102 and the like constitute a control part (controlling means) 32.

An SRAM (storage means or a memory) 104 is mainly for storing a position counter (positional information) of the CIS 1, backup information of positional information (backup positional information), registered data of the image reading device and the like. A DRAM 105 is mainly for storing image data. A PCI/F 106 is an interface for connecting the image reading device and a personal computer (PC) 107. The personal computer 107 is a host computer for changing various kinds of setting data of the image reading device via the interface and requesting activation of various operations.

The control part 32 includes a function of position detecting means for detecting a position of the image reading means according to the positional information stored in the SRAM 104.

The control part 32 drives the driving unit 33 based on the positional information stored in the SRAM 104 to move the image reading means in the sub-scanning direction. At this point, a value of the positional information is increased or decreased according to an amount of driving (the number of driving pulses of the stepping motor). At the same time, the backup information of the positional information is also stored in the SRAM 104.

The image processor 108 is for applying various kinds of image processing to the image data inputted by an image sensor 1. The image sensor 1 is a contact image sensor for reading an image on a document and corresponds to the CIS 1 of FIG. 1.

An operation panel 110 has a display 111 for displaying a state of the apparatus and the like and is for registering an operation instruction input from an operator and various kinds of data and confirming a state of the apparatus via the display 111. An NCU 112 is for controlling public line network, and an MODEM 113 is for modulating and demodulating a digital signal and an analog signal.

Figure 5:
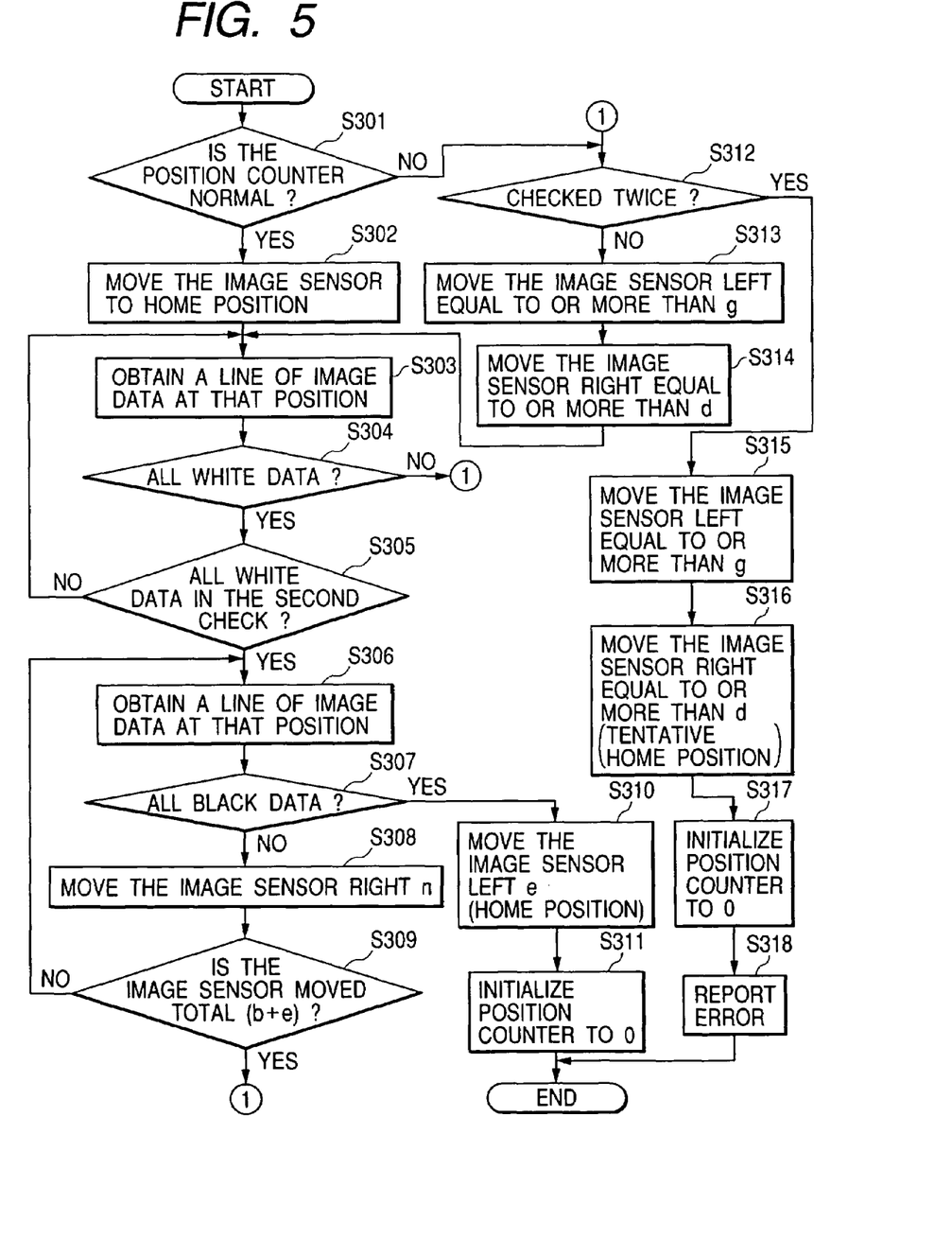
FIG. 5 is a flow chart for explaining a home position detecting operation of the contact image sensor at the time of the start of a power supply in the image reading device of FIG. 1.

FIG. 5 is a flow chart showing a flow of a home position detecting operation of the CIS at the time of the start of a power supply.

First, in order to perform a home position detection of the image sensor as a premise condition of this processing, a reading mode of the device is set at a monochrome binarization mode so as to read an image at a predetermined resolution (e.g., 8 pixels/mm) in the main scanning direction of the image sensor.

Then, in S301, a sum of a position counter stored on an SRAM backup memory is checked. Thus, it is confirmed whether or not a value of the position counter is normal. Here, if it is judged that the position counter is normal, the processing advances to S302, where the image sensor is moved to a position considered as a home position (position where the counter value becomes zero) based on the position counter.

The position counter is a counter for counting the number of steps of a reading motor driven to move the image sensor in the case in which the home position of the image sensor is set at zero. A value stored in a backup area on the SRAM is counted up or counted down each time the reading motor is driven with movement in the right direction counted as a positive number and movement in the left direction counted as a negative number. Therefore, when this value takes a value other than zero, it is seen that the image sensor is in a position other than the home position, and an approximate position of the home position is also found. However, in such a case in which the reading motor rotates idly due to hardware problems, since an actual position of the image sensor shifts from the position corresponding to the value of the position counter, the image sensor cannot return to the home position based only on the position counter. That is, the position where a value of the position counter becomes zero (reference position) shifts from the actual home position. In this case, it is necessary to perform an operation for returning the reference position to the actual home position. Thus, a boundary of white and black reference plates is searched, and the reference position is updated in the following processing of S303 to S311.

According to the position counter, a position of the image sensor is easily grasped and reduction of a processing time can be realized.

If there are a plurality of motor driving patterns (e.g., 150 dpi drive, 300 dpi drive, 600 dpi drive, 1200 dpi drive and the like in 1-2 phases (at the time of monochrome reading) and microsteps (at the time of color reading)), it is sufficient for the position counter to make calculation with a numerical value of the number of steps when the reading motor is driven at the smallest steps (e.g., the microsteps at the time of color reading (divided into six: 3600 dpi drive). That is, in this example, it is sufficient for the position counter to count up or down by 3 each time the motor is driven one step at the time of monochrome drive and to count up or down by 1 each time the motor is driven one step at the time of color drive. For example, if the image sensor stops in a position shifted by 30.0 mm in the right direction from the home position, a value of the position counter at that point is (30.0×3600/25.4/3)× 3=4251.

After moving the image sensor, in order to confirm if the position is actually the home position, the following processing is performed.

If the image sensor is actually in the home position, when image data is obtained in the position, it is sure that all white data can be obtained. This is because, as shown in FIG. 2, the color of the position mark is white in the home position. Thus, one line of image data is obtained in S303, and it is checked if the data is all white data in S304. Here, if the data is judged as an all white line, the processing returns from S305 to S303, where the image data of one line is obtained and it is checked if the data is all white data again for reconfirmation. Here, if it is successfully reconfirmed that the data is all white data, the processing advances from S305 to S306, where a color boundary of the position mark is searched.

First, image data of one line is obtained in the position in S306, and it is checked if the data is all black data in S307. If the data is not all black data, the processing advances to S308, where the image sensor is moved right by n (e.g., 0.02 mm), image data of one line is obtained again, and it is checked if the data is all black data. This processing is repeated until all black data is found in S307 or a moved distance reaches b+e (e.g., 8 mm) in S309. This is because, if there is no change in image data obtained even if the image sensor moves beyond a black part right end position of the position mark, that is, a position b+e (e.g., 8 mm) from the home position, it is likely that the image sensor itself is in an abnormal state. If all black data is found, the processing advances from S307 to S310, where the image sensor is moved left e (e.g., 3 mm), and the position counter is initialized to zero in S311 to end the processing.

If the position counter is judged as abnormal, the image data cannot be judged as all white data, or all black data is not found during the above-described processing, the processing advances to S312, where the following processing is performed.

First, it is checked in S312 if processing home position checks of S313 and S314 have already been performed twice. That is, the number of times of movement in the left position of movable range is counted, and it is checked if the count value is equal to or less than one. If the count value is equal to or less than one, the processing advances to S313, where the image sensor is surely moved to the left position of movable range. That is, for example, the image sensor is moved left by equal to or more than g (e.g., 364 mm). This moved distance includes a margin (e.g., 2 mm) taking into account the case in which structural wear occurs.

At this point, if a position of the CIS is equal to or less than 364 mm from an abutting position, the stepping motor steps out and is stopped at the point when the holder 2 shown in FIG. 1 abuts the stop members 8.

Next, in S314, the image sensor is moved right by d (e.g., 2 mm) from the left position of movable range. If the image sensor has moved normally, this position becomes a home position.

Here, in order to surely move the image sensor to the right position of movable range, the image sensor may be moved right by g (e.g., 364 mm), and thereafter moved right by f+c+b+e (e.g., 360 mm) to the home position. In this case, since the distance from the home position is shorter in the right position of movable range than in the left position of movable range, processing time is reduced more as a whole if the image sensor is moved to the left position of movable range in advance. However, it does not matter if the image sensor is moved to the right position of movable range as long as it is moved surely.

Next, the same processing as the processing of S303 and the following steps is repeated to find if this position is actually a home position. Here, if the image data is not judged as all white data or all black data cannot be found, it is checked if the home position check has already been performed twice.

If it is found in S312 that the home position check has already been performed twice (if the number of times of movement to the left position of movable range in S313 is two), in order to move the image sensor surely to the left position of movable range, the image sensor is moved left by g (e.g., 364 mm) or more in S315 and, thereafter, moved right by d (e.g., 2 mm) in S316, whereby the position is tentatively set as a home position. In this case, the processing for moving the image sensor to the right position for movable range may be performed as in the aforementioned case. If the image sensor is thus tentatively moved to the home position, the processing moves to S317, where the position counter is initialized to zero. However, in this case, since it is possible that the image sensor has not moved properly due to breakdown of the motor or the like during the movement and thus it is uncertain if this position is actually the home position, error is reported in S318 to end the processing.

Although the number of times of the home position detecting operation is two in this embodiment, it is needless to mention that other numbers of times may be employed according to a configuration of the image reading device.

By detecting a home position as described above, the home position can be detected without fail even if a document having a white part and a black part similar to a position mark is placed on the copy board glass.

Figure 6:
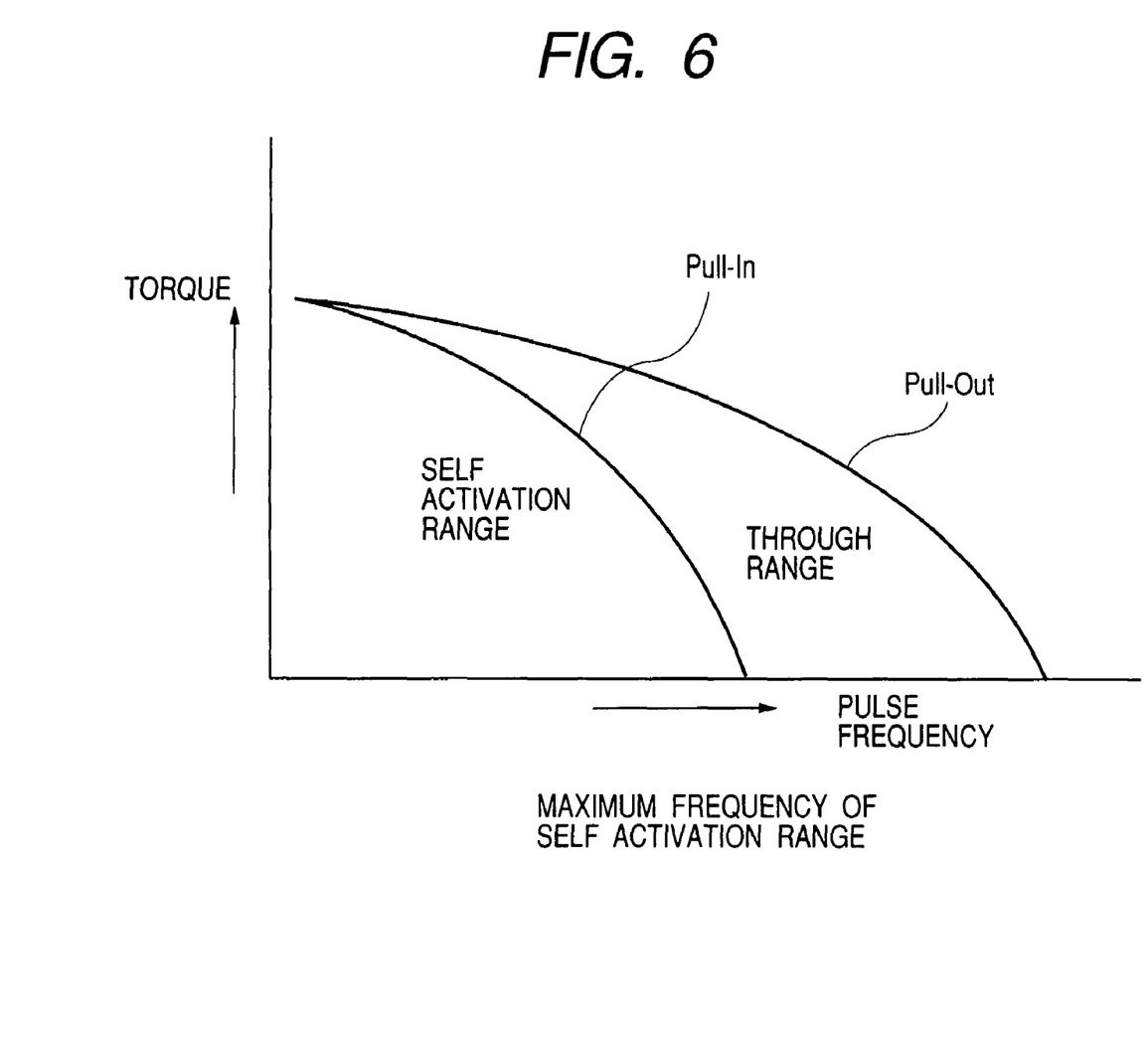
FIG. 6 is a graph of torque curves of a stepping motor in the image reading device of FIG. 1.

FIG. 6 is a graph showing torque curves of the stepping motor 21.

In the figure, the vertical axis represents an output torque of the stepping motor 21 and the horizontal axis represents a pulse frequency.

In general, a stepping motor has two torque curves, namely, Pull-In and Pull-Out. Pull-In is a torque with which the stepping motor can be activated synchronizing with an input pulse, and Pull-Out is a torque with which the stepping motor can be activated synchronizing with an input pulse when a pulse frequency is gradually increased. On the graph, the inside part of the torque curve of Pull-In is called a self activation range, and a maximum frequency at which the stepping motor can be activated synchronizing with an input pulse at no load is called a maximum frequency of self activation range. In addition, an area between Pull-In and Pull-Out is called a through area.

In the embodiment of the present invention, the stepping motor 21 is driven at a pulse frequency of the through area that is higher than the maximum frequency of self activation range in the case in which the holder 2 is caused to abut the stop members 8 to be stopped. When the holder 2 abuts the stop members 8 and the stepping motor 21 steps out at the pulse frequency higher than the maximum frequency of self activation range, the stepping motor 21 is not activated from that state, and a torque applied to the driving system such as the deceleration gear 22, the pulley 23, the belt 5 or the like falls to almost zero. Thus, the driving system is not damaged.

In addition, the stepping motor 21 is driven at a frequency higher than a pulse frequency at the time when reading is performed in the case in which the holder 2 is caused to abut the stop members 8 to be stopped. Thus, detection of a home position can be performed faster than in the case where a boundary between a white part and a black part is detected while reading an image as in the conventional example. In this embodiment, the stepping motor 21 is driven at a speed that is approximately 2.7 times as high as a reading speed.

In the image reading device 121 of this embodiment, the stepping motor 21 is driven at a pulse frequency of the through area that is higher than the maximum frequency of self activation range when the holder 2 is caused to abut the stop members 8 to be stopped. When the holder 2 abuts the stop members 8 and the stepping motor 21 steps out at the pulse frequency higher than the maximum frequency of self activation range, the stepping motor 21 is not activated from that state, and a torque applied to the driving system such as the deceleration gear 22, the pulley 23, the belt 5 or the like falls to almost zero. Thus, the driving system is not damaged.

In addition, in the image reading device 121 of this embodiment, the stepping motor 21 is driven at a pulse frequency higher than a pulse frequency at the time when reading is performed in the case in which the holder 2 is caused to abut the stop members 8 to be stopped. Thus, detection of the home position 13 can be performed faster than in the case where the color boundary position 12 between the white part 7a and the black part 7b is detected while reading an image. In this embodiment, the stepping motor 21 is driven at a speed that is approximately 2.7 times as high as a reading speed.

Figure 7:
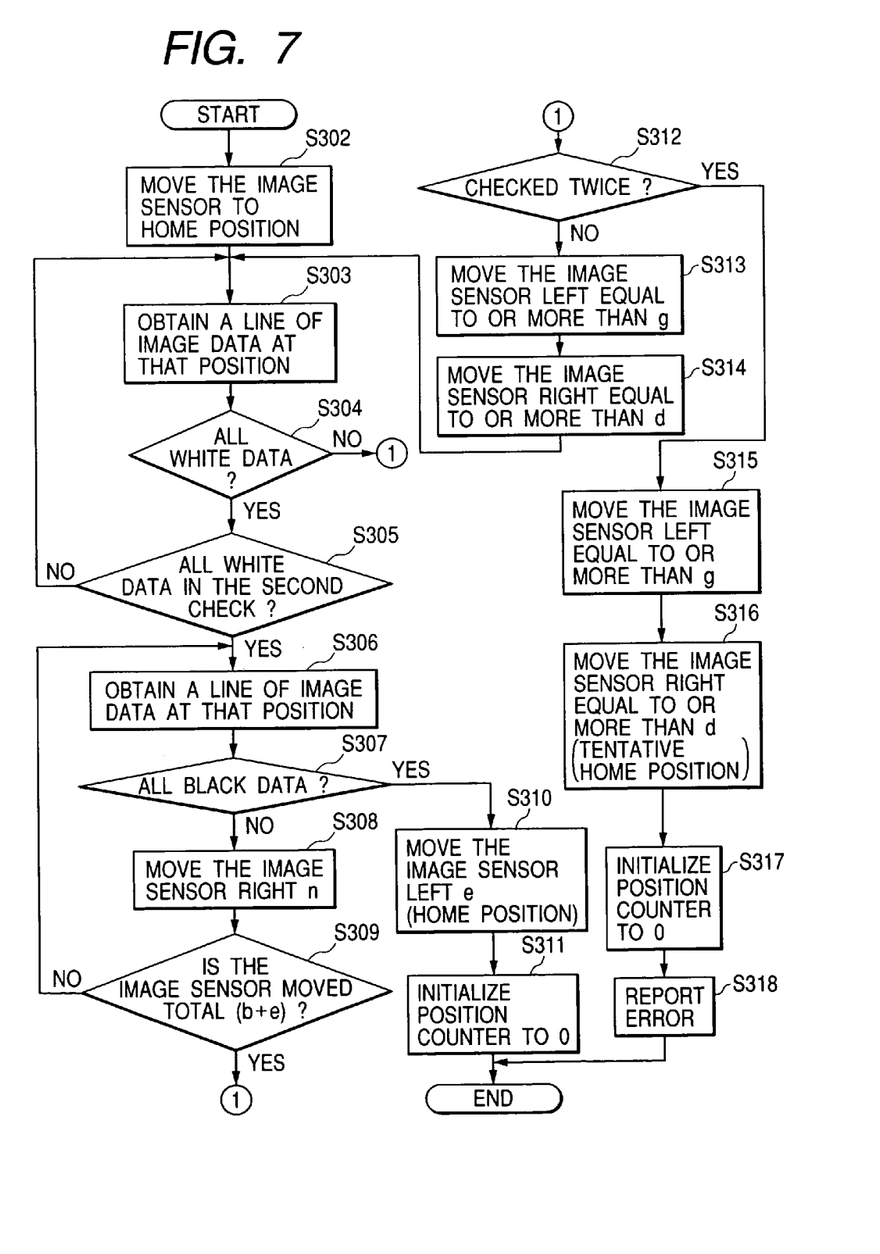
FIG. 7 is a flow chart showing home position detection processing of an image sensor after completion of reading and suspension in an MFP as an embodiment of the present invention.

FIG. 7 is a flow chart showing home position detection processing of an image sensor after completion of reading and suspension.

A flow of a home position detecting operation of the image sensor after completion of reading and suspension is the same as the flow of the home position detecting operation at the time of start of a power supply which is shown in FIG. 3 except that it is not checked whether or not a position counter is normal at the start of the processing. Therefore, boxes of the same processing are denoted by the same reference symbols, and description of the boxes will be omitted.

Figure 8:
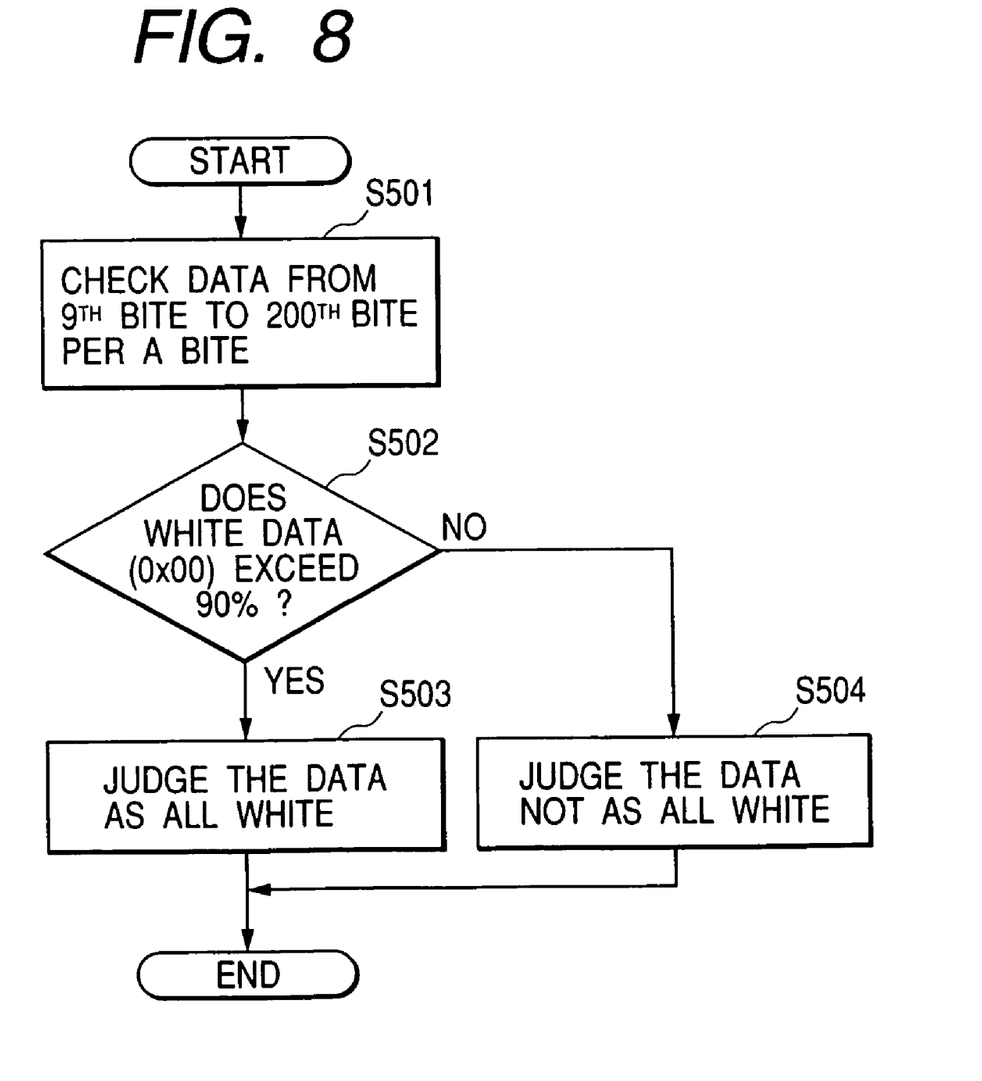
FIG. 8 is a flow chart showing judgment processing on whether data are all white in the MFP as an embodiment of the present invention.

FIG. 8 is a flow chart showing a method of judging whether image data is all white data during the home position detection processing of the image sensor.

For example, if the image sensor of this device has an A4 width in the main scanning direction (216 mm), it is possible to obtain data of maximum 216 byte for one line with a resolution of 8 pixels/mm in the monochrome binarization mode. However, it is likely that data on both ends is incorrect due to the structure of the device and the influence of light. Thus, it is judged in S501 if data of a central part of 200 bytes is white data (0×00) per a byte (per eight pixels) neglecting each data of eight bytes at the both ends. If it is judged in S502 that equal to or more than 90% of this 200 byte data is the white data, the processing advances to S503, where the data is judged as all white. If less than 90% of the 200-byte data is the white data, the processing advances to S504, where the data is judged not as all white. In this way, conditions for judgment are made more strict by judging data per byte (per eight pixels), but processing time can be reduced. Although the above-described numerical values are cited in this embodiment, it is needless to mention that the present invention is not limited to the numerical values and various combination of numerical values are possible taking into account a width of the image sensor, a structure of the device and the like.

Figure 9:
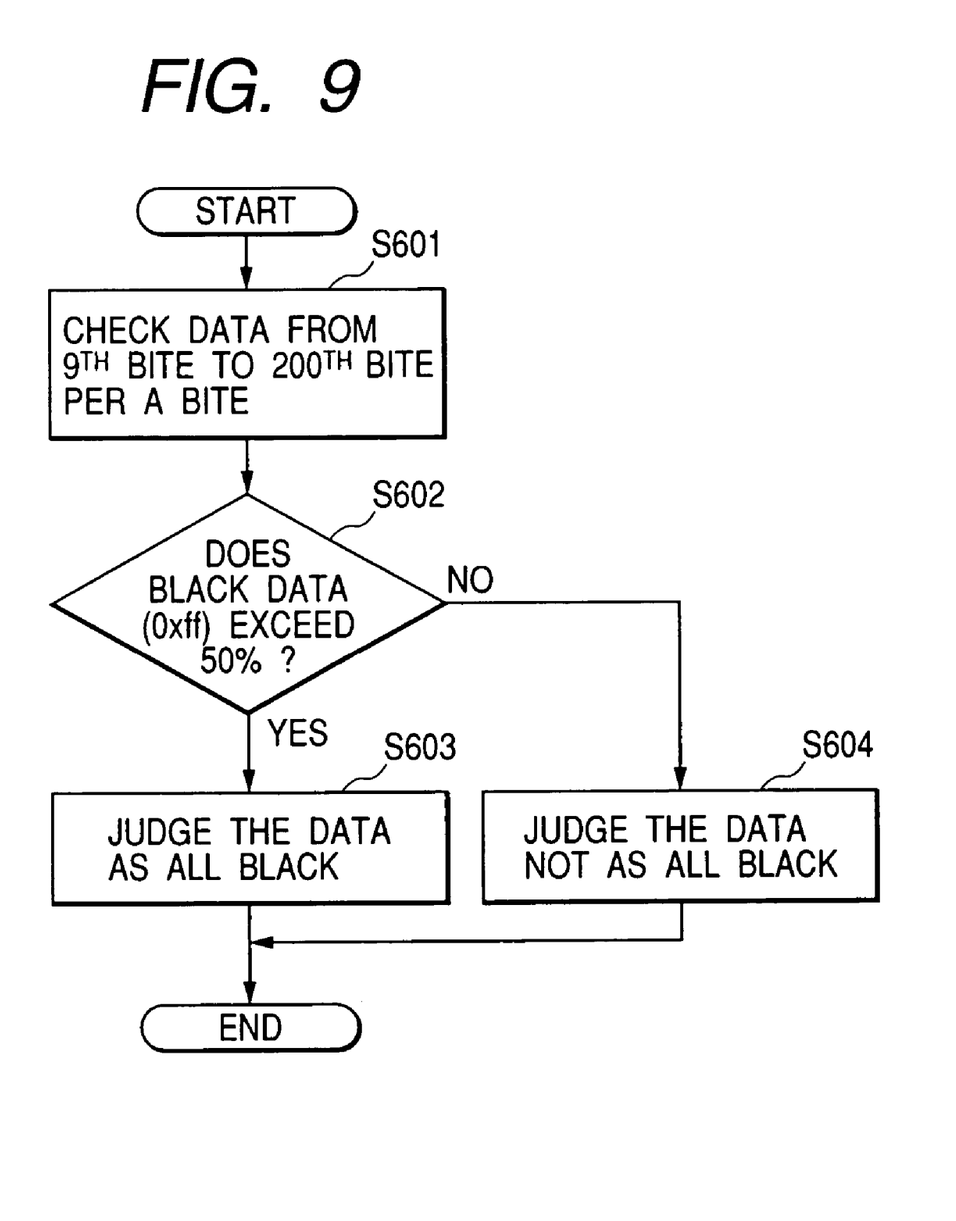
FIG. 9 is a flow chart showing judgment processing on whether data is all black in the MFP as an embodiment of the present invention.

FIG. 9 is a flow chart showing a method of judging all black data during the home position detection processing of the image sensor.

For example, if the image sensor of this device has an A4 width in the main scanning direction (216 mm), it is possible to obtain data of maximum 216 byte for one line with a resolution of 8 pixels/mm in the monochrome binarization mode. However, it is likely that data on both ends is incorrect due to the structure of the device and the influence of light. Thus, it is judged in S601 if data of a central part of 200 bytes is black data (0×FF) per a byte (per eight pixels) neglecting each data of eight bytes at the both ends. If it is judged in S602 that equal to or more than 50% of this 200 byte data is the black data, the processing advances to S603, where the data is judged as all black. If less than 50% of the 200-byte data is the black data, the processing advances to S604, where the data is judged not as all black. It is because at the time of detecting the white part, reading is performed with respect to the plane, whereas in this case, the boundary when the image sensor moves form the white part to the black part is detected, so that the numeric value is set taking into consideration a case of just reading of the middle of the boundary or a case of performing the reading somewhat obliquely due to a structure of the device. In this way, conditions for judgment are made more strict by judging data per byte (per eight pixels), but processing time can be reduced. Although the above-described numerical values are cited in this embodiment, it is needless to mention that the present invention is not limited to the numerical values and various combination of numerical values are possible taking into account a width of the image sensor, a structure of the device and the like.

Image Reading Device as a Second Embodiment

Figure 10:
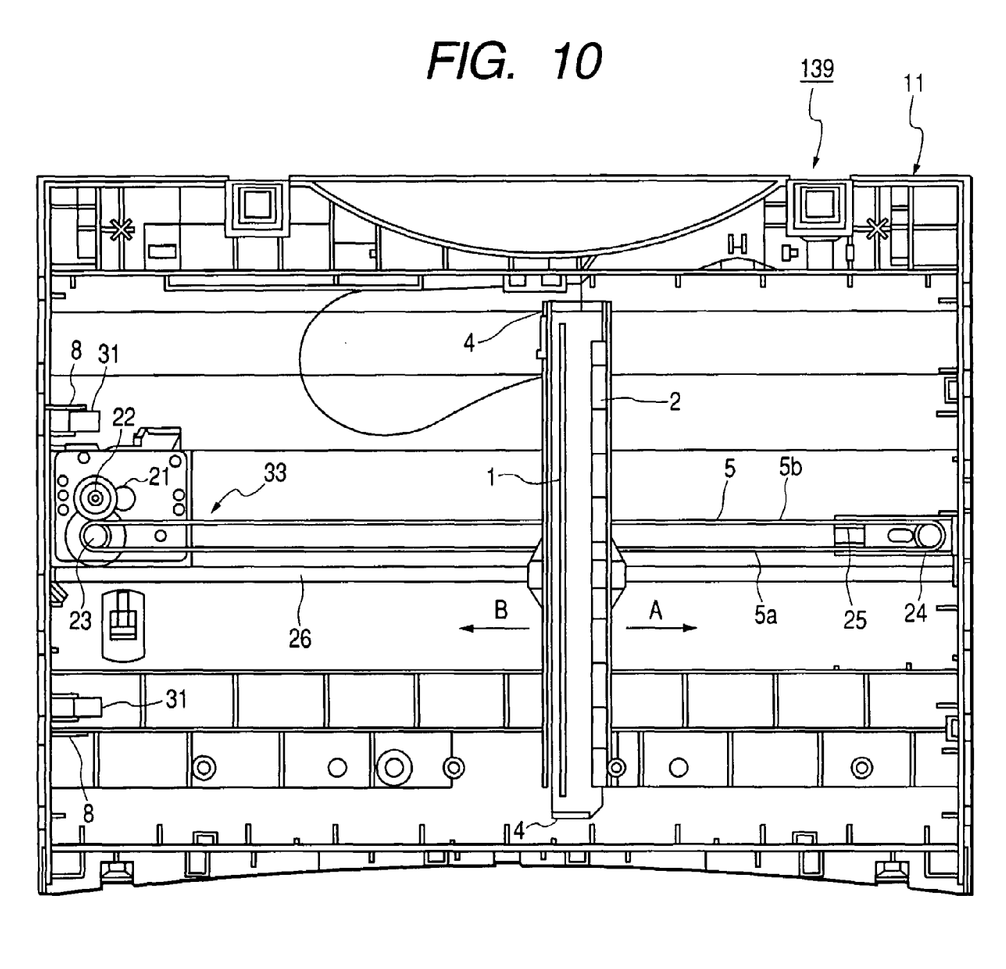
FIG. 10 is a plan view of an image reading device in a second embodiment of the present invention at the time when a copy board glass is removed.

FIG. 10 is a plan view of an image reading device 139 of a second embodiment of the present invention from which a copy board glass is removed. This image reading device 139 has a different configuration from the image reading device 121 of the first embodiment in that elastic members (buffering means) 31 are provided in the vicinity of the stop members 8 on the frame body 11. Therefore, identical portions other than this are denoted by the identical reference symbols, and description of these portions will be omitted.

The elastic members 31 project out to the holder 2 side slightly more than to the stop members 8. Thus, the holder 2 moving in the arrow B direction abuts the elastic members 31 before abutting the stop members 8. The holder 2 is received by the elastic members 31 to have its momentum impaired, and then abuts the stopping members 8 to stop. Thus, impact of the holder 2 abutting the stop members 8 is lessened. The CIS 1 is hardly subjected to the impact of the holder 2 abutting the stop members 8 and is thus no longer damaged thereby.

The elastic members 31 may be formed of any material as long as it absorbs impact such as a sponge, a coil spring, a leaf spring or the like. However, if an elastic force is too strong, it is likely that the elastic member 31 stops the holder 2 before the holder 2 abuts the stop members 8. Therefore, the elastic force of the elastic member 31 should be an elastic force that can impair momentum of the holder 2 and is enough for causing the holder 2 to abut the stop members 8.

Further, the image reading devices 121 and 139 of the first and second embodiments can read not only a document in a sheet form but also a book.

Note that, the present invention may be applied to both a system constituted by a plurality of apparatuses (e.g., a host computer, an interface apparatus, a reader and a printer) and an apparatus consisting of one unit (e.g., a copying machine and a facsimile machine).

In addition, it is needless to mention that the object of the present invention can be attained also in a case where a storage medium (or recording medium) storing a program code of software, which realizes the aforementioned function of the embodiment, is supplied to a system or an apparatus, and a computer (or a CPU or an MPU) of the system, or the apparatus reads out and executes the program code stored in the storage medium. In this case, the program code itself read out from the storage medium realizes the aforementioned function of the embodiment, and thus the storage medium having the program code stored therein constitutes the present invention. In addition to realizing the function of the embodiment by executing the program code read by the computer, it is needless to mention that when an operating system (OS) or the like running on the computer performs all or a part of actual processing based on an instruction of the program code, whereby the aforementioned function of the embodiment is also realized.

Moreover, it is needless to mention that the program code read out from the storage medium is written in a memory provided in a function extending card inserted in the computer or a function extending unit connected to the computer and, thereafter, a CPU or the like provided in the function extending card or the function extending unit performs all or a part of the actual processing based on an instruction of the program code, whereby the aforementioned function of the embodiment is also realized.

If the present invention is applied to the above-described storage medium, a program code corresponding to the flow chart described before (shown in FIG. 3 and/or FIG. 4) is stored in the storage medium.

The image reading device of the present invention is capable of detecting a reading reference position promptly and without fail with a simple configuration when data of the reading reference position is not stored in a memory unit or when the data is destroyed due to some reason.

As described above, according to the present invention, an image reading device that is high in productivity and can be made compact, a method of controlling the image reading device, a control program for the method and a storage medium having the control program stored therein can be provided.

What is claimed is:

1. An image reading apparatus comprising:
   an image reading unit adapted to read a document;
   a driving unit adapted to move said image reading unit;
   a position detecting unit adapted to detect a position of said image reading unit;
   a storing unit adapted to store position information in a case that said position detecting unit detects that said image reading unit is placed at a reference position;
   an updating unit adapted to update the position information stored in said storing unit; and
   a judging unit adapted to judge whether said position detecting unit detects that the position of said image reading unit is normal or abnormal, wherein said updating unit updates the position information in a case that said judging unit judges that the image reading unit position is abnormal.

2. An image reading apparatus according to claim 1, wherein said driving unit moves said image reading unit to an end of a movable range in a direction opposite from the end position of the movable range to update the position information by said updating unit in a case said judging unit judges that the image reading unit position is abnormal.

3. An image reading apparatus according to claim 2, wherein said updating unit notifies an error notification in a case that said image reading unit does not detect the image for detecting a position within a predetermined distance range even after said image reading unit is moved from the end of the movable range by said driving unit a predetermined number of times.

4. An image reading apparatus according to claim 2, wherein said updating unit sets a tentative reference position in a case that said image reading unit does not detect the image for detecting a position within a predetermined distance range even after said image reading unit is moved from the end of the movable range by said driving unit a predetermined number of times.

5. An image reading apparatus according to claim 4, wherein the tentative reference position is a position at a predetermined distance from either of the ends of the movable range.

6. An image reading apparatus according to claim 4, wherein, in a case that said driving unit moves said image reading unit to the end of the movable range, said image reading unit is moved at a speed faster than a speed in a case that said image reading unit reads a document.

7. An image reading apparatus according to claim 2, wherein the image for detecting a position comprises black and white.

8. An image reading apparatus according to claim 2, further comprising a stopping unit adapted to restrict movement of said image reading unit by abutting said image reading unit, wherein said driving unit moves said image reading unit to the end of the movable range and said image reading unit abuts said stopping unit, in the case that said image reading unit does not detect an image for detecting a position after said image reading unit is moved to the reference position by said driving unit on a basis of the position information stored in said storing unit.

9. An image reading apparatus according to claim 8, wherein said driving unit further comprises a stepping motor, and wherein, in the case that said driving unit moves said image reading unit to the ends of movable range, said driving unit drives the stepping motor to abut the image reading unit on said stepping unit.

10. An image reading apparatus according to claim 8, wherein said driving unit further comprises a plurality of pulleys and a belt tensioned between said a plurality of pulleys and connected to said image reading unit, wherein said image reading unit is moved by rotating one of said plurality of pulleys with the belt, and said stopping unit is positioned at the side wherein the tension of the belt is higher in the case that said image reading unit is moved toward a predetermined direction.

11. An image reading apparatus according to claim 8, wherein said image reading unit includes a holder for holding an image sensor, said stopping unit has a rib on a structure in which an image reading unit is contained, and said stopping unit is provided to stop said image reading unit by abutting the holder on said rib.

12. An image reading apparatus according to claim 8, further comprising a buffering unit adapted to reduce an impact in which said image reading unit abuts said stopping unit prior to the abutment of said image reading unit on said stopping unit.

13. A control method of an image reading apparatus, wherein said image reading apparatus includes an image reading unit adapted to read a document; a driving unit adapted to move said image reading unit; a position detecting unit adapted to detect a position of said image reading unit to move said image reading unit by said driving unit; a storing unit adapted to store position information in a case that said position detecting unit detects that said image reading unit is placed at a reference position; an updating unit adapted to update the position information stored in said storing unit; and a judging unit adapted to judge whether said position detecting unit is normal or abnormal, wherein said updating unit updates the reference position in a case that said judging unit judges that said position detecting unit is abnormal, comprising:

a step of detecting a position of said image reading unit to move said image reading unit by said driving unit; and     a step of storing position information in a case that said image reading unit is placed at a reference position in said step of detecting a position of said image reading; and     a step of updating the position information stored in said step of storing position information.

14. A control program stored on a computer-readable medium for controlling an image reading apparatus by a computer, wherein said image reading apparatus includes an image reading unit adapted to read a document and a driving unit adapted to move said image reading unit, a position detecting unit adapted to detect a position of said image reading unit, a storing unit adapted to store position information in a case that said position detecting unit detects that said image reading unit is placed at a reference position, an updating unit adapted to update the position information stored in said storing unit, and a judging unit adapted to judge whether said position detecting unit detects that the position of said image reading unit is normal or abnormal, wherein said updating unit updates the reference position in a case that said judging unit judges that the image reading unit position is abnormal, comprising executing:

a step of detecting a position of said image reading unit to move said image reading unit by said driving unit; and     a step of storing position information in a case that said image reading unit is placed at a reference position in said step of detecting a position of said image reading; and     a step of updating the position information stored in said step of storing position information.

* * * * *